(12) United States Patent
Xia et al.

(10) Patent No.: US 11,232,228 B2
(45) Date of Patent: Jan. 25, 2022

(54) METHOD AND DEVICE FOR IMPROVING DATA STORAGE SECURITY

(71) Applicant: HANGZHOU HIKVISION DIGITAL TECHNOLOGY CO., LTD., Hangzhou (CN)

(72) Inventors: Weiqiang Xia, Hangzhou (CN); Weichun Wang, Hangzhou (CN); Qiqian Lin, Hangzhou (CN); Wei Wang, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 114 days.

(21) Appl. No.: 16/622,609

(22) PCT Filed: May 22, 2018

(86) PCT No.: PCT/CN2018/087862
§ 371 (c)(1),
(2) Date: Dec. 13, 2019

(87) PCT Pub. No.: WO2018/228147
PCT Pub. Date: Dec. 20, 2018

(65) Prior Publication Data
US 2020/0387628 A1    Dec. 10, 2020

(30) Foreign Application Priority Data
Jun. 15, 2017 (CN) .......................... 201710452539.4

(51) Int. Cl.
*G06F 21/62* (2013.01)
*H04L 29/06* (2006.01)
(Continued)

(52) U.S. Cl.
CPC ............ *G06F 21/6245* (2013.01); *G06F 7/08* (2013.01); *H03M 13/154* (2013.01); *H04L 47/82* (2013.01);
(Continued)

(58) Field of Classification Search
CPC .... G06F 21/6245; G06F 7/08; H03M 13/154; H04L 47/82; H04L 63/105; H04L 67/1097
See application file for complete search history.

(56) References Cited

U.S. PATENT DOCUMENTS 8,245,113 B2 * 8/2012 Winarski ............ G06F 11/1088
714/770
9,483,657 B2 * 11/2016 Paul .................... G06F 21/6245
(Continued)

FOREIGN PATENT DOCUMENTS

CN 102546755 7/2012
CN 103118133 5/2013
(Continued)

OTHER PUBLICATIONS

International Search Report and Written Opinion issued in corresponding PCT Application No. PCT/CN2018/087862, dated Aug. 17, 2018 (English translation of International Search Report provided).
Extended European Search Report issued in Corresponding European Application No. 18817158.1, dated May 18, 2020 (7 pages).

*Primary Examiner* — Sm A Rahman
(74) *Attorney, Agent, or Firm* — Norton Rose Fulbright US LLP

(57) ABSTRACT

A method and device for improving data storage security, related to the technical field of cloud storage is disclosed. The method includes: detecting access counts of user data sets in a cloud storage resource pool, where the user data sets in the cloud storage resource pool are data obtained by
(Continued)

encoding with an erasure coding algorithm of a first security level; determining a first user data set whose access count in the cloud storage resource pool meets a preset condition; obtaining a second security level according to attribute information of the cloud storage resource pool, wherein the attribute information includes the first security level and an increment for security step; and re-encoding the first user data set with an erasure coding algorithm of the second security level to obtain re-encoded first user data sets.

9 Claims, 4 Drawing Sheets

(51) Int. Cl.
  *H04L 29/08* (2006.01)
  *G06F 7/08* (2006.01)
  *H03M 13/15* (2006.01)
  *H04L 12/911* (2013.01)
(52) U.S. Cl.
  CPC ........ *H04L 63/105* (2013.01); *H04L 67/1097* (2013.01)

(56) References Cited

U.S. PATENT DOCUMENTS

| | | | | |
|---|---|---|---|---|
| 9,495,246 | B2* | 11/2016 | Gordon | G06F 11/1076 |
| 2011/0029809 | A1* | 2/2011 | Dhuse | H04L 69/40 |
| | | | | 714/6.1 |
| 2011/0029840 | A1* | 2/2011 | Ozzie | H03M 13/05 |
| | | | | 714/763 |
| 2015/0229339 | A1 | 8/2015 | Reinart | |
| 2016/0006461 | A1 | 1/2016 | Yin et al. | |
| 2016/0211869 | A1 | 7/2016 | Blaum et al. | |
| 2017/0091032 | A1 | 3/2017 | Peake | |

FOREIGN PATENT DOCUMENTS

| | | |
|---|---|---|
| CN | 203219314 | 9/2013 |
| CN | 103631666 | 3/2014 |
| CN | 104205056 | 12/2014 |
| CN | 104281533 | 1/2015 |
| CN | 105630418 | 6/2016 |
| CN | 105991734 | 10/2016 |
| WO | WO 2016092384 | 6/2016 |

* cited by examiner

METHOD AND DEVICE FOR IMPROVING DATA STORAGE SECURITY

CROSS-REFERENCE TO RELATED APPLICATIONS

The present application is a national phase under 35 U.S.C. § 371 of International Application No. PCT/CN2018/087862, filed May 22, 2018, which claims priority to Chinese Patent Application No. 201710452539.4, filed with the China National Intellectual Property Administration on Jun. 15, 2017 and entitled "Method and device for improving data storage security", each of which are incorporated herein by reference in their entirety.

TECHNICAL FIELD

The present application relates to the technical field of cloud storage, and in particular, to a method and device for improving data storage security.

BACKGROUND

Due to the booming Internet technology, massive amounts of data have been generated on the Internet. In today's "big data era", in order to cope with such a large amount of data, and with the rise of cloud computing technology, a new information storage technology emerges quietly, that is, cloud storage technology based on the cloud storage system. A cloud storage system refers to a system that integrates a large number of different types of devices in a network via application software through cluster application, grid technology, or distributed file system to provide data storage and service access functions together. The cloud storage system includes: a storage server and a management server. The storage server may contain multiple storage units, that is, nodes. The nodes may be disks or other forms of storage media. Nodes are used to store data. The management server is used to manage the data stored in the nodes of the storage server.

In a cloud storage system, user data is divided into a plurality of data segments that are stored in a plurality of nodes of the storage server. If one of the multiple nodes fails, the user data is prone to loss. At present, network RAID (Redundant Arrays of Independent Disks) can perform cross-node protection on user data while saving user costs. Currently, common network RAID is mainly based on EC (Erasure Code). EC is a data protection method, and is also a coding fault tolerance technology. The device uses the EC algorithm to divide user data into multiple data segments, and redundantly encodes multiple data segments to obtain redundant data. The multiple data segments and redundant data are stored in different nodes. In the event that a part of the nodes fails, the user data is still readable.

EC security level is typically represented by data protection formula N+M. N is the number of data segments of the user data, and M is the number of redundant data segments. M and N are integers greater than 0, and M is less than or equal to N. M can also be called a security step. That is, the user data is stored in N nodes, and in the case where M nodes are damaged, the data is still readable.

However, storage of user data with a fixed security level N+M to store user data has the problem of low security of user data.

SUMMARY

The purpose of the embodiments of the present application is to provide a method and device for improving data storage security to improve the security of user data in cloud storage. The specific technical solutions are as follows:

An embodiment of the present application discloses a method for improving data storage security, including:

detecting access counts of user data sets in a cloud storage resource pool, where the user data sets in the cloud storage resource pool are data obtained by encoding with an erasure coding algorithm of a first security level;

determining a first user data set whose access count in the cloud storage resource pool meets a preset condition;

obtaining a second security level according to attribute information of the cloud storage resource pool, wherein the attribute information includes the first security level and an increment for security step, and the second security level has a security step greater than that of the first security level; and re-encoding the first user data set with an erasure coding algorithm of the second security level to obtain re-encoded first user data sets.

Optionally, detecting access counts of user data sets in a cloud storage resource pool includes:

periodically detecting access counts of user data sets in the cloud storage resource pool;

determining a first user data set whose access count in the cloud storage resource pool meets a preset condition comprises:

determining, according to the periodically detected access counts of user data sets, a plurality of user data sets whose access counts meet a preset condition in the cloud storage resource pool as first user data sets.

Optionally, determining a first user data set whose access count in the cloud storage resource pool meets a preset condition includes:

sorting user data sets in the cloud storage resource pool in a descending order of access counts to obtain top L user data sets, and determining the top L user data sets as first user data sets, wherein L is an integer greater than 0; or extracting, from the cloud storage resource pool, user data sets whose access counts are greater than or equal to a preset access count threshold as first user data sets.

Optionally, obtaining a second security level according to attribute information of the cloud storage resource pool includes:

for a first security level of N+M and an increment for security step of i, determining the second security level as N+(M+i), wherein, N is the number of nodes for a user data set in the cloud storage resource pool, and M and M+i are maximum numbers of abnormal nodes in the nodes for the user data set in the cloud storage resource pool when user data set can be read, wherein M, N, and i are integers greater than 0, and M+i is less than or equal to N.

Optionally, before detecting access counts of user data sets in a cloud storage resource pool, the method further includes:

allocating a storage space for the cloud storage resource pool according to the attribute information of the cloud storage resource pool; and encoding user data sets in the cloud storage resource pool with the erasure coding algorithm of the first security level.

An embodiment of the present application further discloses a device for improving data storage security, including:

an access count detection module, configured for detecting access counts of user data sets in a cloud storage resource pool, where the user data sets in the cloud storage resource pool are data obtained by encoding with an erasure coding algorithm of a first security level;

a first user data determination module, configured for determining a first user data set whose access count in the cloud storage resource pool meets a preset condition;

a security level determination module, configured for obtaining a second security level according to attribute information of the cloud storage resource pool, wherein the attribute information includes the first security level and an increment for security step, and the second security level has a security step greater than that of the first security level;

a re-encoding module, configured for re-encoding the first user data set with an erasure coding algorithm of the second security level to obtain re-encoded first user data sets.

Optionally, the access count detection module includes:

a periodic detection submodule, configured for periodically detecting access counts of user data sets in the cloud storage resource pool;

the first user data determination module comprises:

a multiple user data determination submodule, configured for determining, according to the periodically detected access counts of user data sets, a plurality of user data sets whose access counts meet a preset condition in the cloud storage resource pool as first user data sets.

Optionally, the first user data determination module includes:

a first determination submodule, configured for sorting user data sets in the cloud storage resource pool in a descending order of access counts to obtain top L user data sets, and determining the top L user data sets as first user data sets, wherein L is an integer greater than 0; or a second determination submodule, configured for extracting, from the cloud storage resource pool, user data sets whose access counts are greater than or equal to a preset access count threshold as first user data sets.

Optionally, the security level determination module is specifically configured for:

for a first security level of N+M and an increment for security step of i, determining the second security level as N+(M+i), wherein, N is the number of nodes for a user data set in the cloud storage resource pool, and M and M+i are maximum numbers of abnormal nodes in the nodes for the user data set in the cloud storage resource pool when the user data set can be read, wherein M, N, and i are integers greater than 0, and M+i is less than or equal to N.

Optionally, the device for improving data storage security in the embodiment of the present application further includes:

a storage space allocation module, configured for allocating a storage space for the cloud storage resource pool according to the attribute information of the cloud storage resource pool; and an initial coding module, configured for encoding user data sets in the cloud storage resource pool with the erasure coding algorithm of the first security level.

An embodiment of the present application further discloses an electronic device, including a processor and a memory, where the memory is used to store a computer program; the processor is configured to execute the program stored on the memory to perform the method steps for improving data storage security as described above.

An embodiment of the present application further discloses a machine readable storage medium having a computer program stored thereon which, when executed by a processor, causes the processor to perform the method steps for improving data storage security as described above.

An embodiment of the present application further discloses a computer program which, when executed by a processor, causes the processor to perform the method steps of improving data storage security as described above.

The embodiments of the present application provide a method and device for improving data storage security. Access counts of user data sets in a cloud storage resource pool are detected, and thus a first user data set whose access count in the cloud storage resource pool meets a preset condition is determined. A second security level is obtained according to attribute information of the cloud storage resource pool. The security step of the second security level is greater than the security step of the first security level. The first user data set is re-encoded with an erasure coding algorithm of the second security level to obtain re-encoded first user data sets. In this way, the first user data is re-encoded in the second security level having an increased security step. As such, the security of the first user data set is improved and thus the security of user data in the cloud storage resource pool is improved. Of course, any implementation of the products or methods of the present application does not necessarily achieve simultaneously all the advantages described above.

BRIEF DESCRIPTION OF THE DRAWINGS

In order to more clearly illustrate the technical solutions in the embodiments of the present application or related art, the drawings used in the embodiments or the related art descriptions will be briefly described below. Obviously, the drawings in the following description are only some of the embodiments of the present application, and those skilled in the art can obtain other drawings according to the drawings without any creative work.

DETAILED DESCRIPTION

Figure 1:
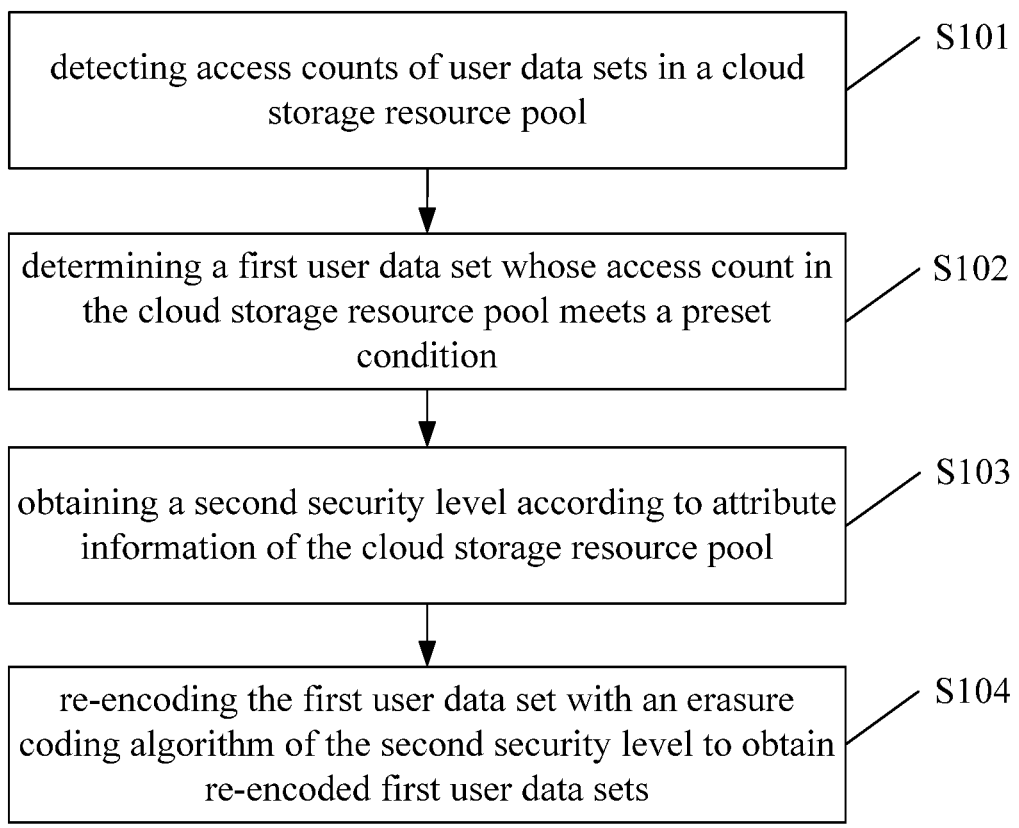
FIG. 1 is a flowchart of a method for improving data storage security according to an embodiment of the present application.

The technical solutions in the embodiments of the present application are clearly and completely described in the following with reference to the drawings in the embodiments of the present application. It is obvious that the described embodiments are only a part of the embodiments of the present application, and not all of the embodiments. All other embodiments obtained by a person of ordinary skill in the art based on the embodiments of the present application without departing from the inventive scope are within the scope of the present application.

A cloud storage system is a network storage system that puts storage resources in the cloud for user access. In a cloud storage system, users can enjoy network storage services by accessing the network. In this way, a user does not need to store user data in a local storage device. In addition, in the cloud storage system, a user can also manage user data stored in the cloud at any time, for example, sharing the stored user data with other users. However, in a cloud storage system, it is particularly important to ensure security of user data while facilitating user accesses to user data in the cloud storage system.

Network RAID provides cross-node protection to user data. In current EC-based network RAID, for a determined security level of N+M, the user data cannot be read if abnormal nodes are more than M. N is the number of data segments of a user data set, that is, the number of nodes storing the user data set. M is the maximum number of abnormal nodes when the user data set can be read, that is, M is the number of redundant data segments, i.e., the security step. When the number of damaged nodes in the N nodes storing user data is less than M, the user data can still be read, that is, the storage server can correctly decode stored user data and send it to the user.

Based on this, the embodiment of the present application provides a method and device for improving security of data storage to improve security of user data in cloud storage.

Steps in the embodiment of the present application may be implemented in a cloud storage system, including a storage server and a management server. The management server can allocate storage space to a user as a cloud storage resource pool. The size of the cloud storage resource pool is allocated by the management server according to need of the user. The storage space of a cloud storage resource pool may be composed of a plurality of nodes in the storage server.

After the management server allocates a cloud storage resource pool to the user, the user can store data in the cloud storage resource pool, that is, store user data in nodes of the storage server. Specifically, the storage server uses EC algorithm to encode obtained user data to obtain encoded user data and redundant data. The encoded user data and redundant data are stored in nodes included in the cloud storage resource pool.

When a user accesses user data in a cloud storage resource pool, the user sends an access request to the storage server. The storage server decodes encoded user data stored in nodes with EC algorithm, and transmits the decoded user data to the user.

In this embodiment, the management server detects access counts of user data sets in the cloud storage resource pool. Access count of a data set represents the number of accesses to the data set. The user data sets in the cloud storage resource pool are encoded with an erasure coding algorithm of a first security level. The management server determines a first user data set whose access count in the cloud storage resource pool meets a preset condition, and obtains a second security level according to attribute information of the cloud storage resource pool. The attribute information includes the first security level and an increment for security step. The security step of the second security level is greater than the security step of the first security level. The management server sends a re-encoding instruction to the storage server. The re-encoding instruction includes the second security level. The storage server decodes the first user data set in the first security level, and re-encodes the decoded first user data sets in the second security level to obtain re-encoded first user data set. The re-encoded first user data set is stored in a cloud storage resource pool.

In this way, the first user data sets are re-encoded with the second security level whose security step is increased. As such, security of the first user data set is improved, and thus security of user data in the cloud storage resource pool is improved.

The method for improving data storage security provided by the embodiment of the present application is described in detail below.

Referring to FIG. 1, FIG. 1 is a flowchart of a method for improving data storage security according to an embodiment of the present application, including the following steps:

S101, detecting access counts of user data sets in a cloud storage resource pool. The user data sets in the cloud storage resource pool are obtained by data encoding with an erasure coding algorithm of a first security level.

The management server in the cloud storage system records and detects access count of each user data set. Through access counts, the management server can determine what kind of user data is hot data and what kind of user data is non-hot data. For example, the management server determines user data sets whose access counts exceed a certain threshold as hotspot data.

The first security level is represented by N+M. That is, each user data set in the cloud storage resource pool includes N data segments encoded with the erasure coding algorithm of a first security level. The storage server encodes the N data segments with the erasure coding algorithm of a first security level to obtain N encoded data segments and M redundant data segments.

In this case, an access count is calculated as follows. Upon receiving a user's access request to one or more data segments of the N data segments of a user data set, the storage server obtains the requested one or more data segments of the user data set from the cloud storage resource pool, and decodes the one or more data segments with an erasure coding algorithm of a first security level. The decoded user data set is sent to the user. In addition, the storage server notifies the management server to increase the access count of the user data set by one.

In the embodiment of the present application, user data sets in the cloud storage resource pool are stored in nodes of the storage server. The storage server encodes the user data sets with erasure coding algorithm of a first security level, and stores the encoded data in the node of the storage server.

In the embodiment of the present application, the management server in the cloud storage system may be configured with a plurality of cloud storage resource pools. In other words, storage spaces for a plurality of cloud storage resource pools are allocated. The first security level of each cloud storage resource pool may be the same or different.

S102, determining a first user data set whose access count in the cloud storage resource pool exceeds a preset threshold.

In other words, in S102, any user data set having an access count that meets a preset condition in the cloud storage resource pool is determined as a first user data set.

The preset condition can be a threshold for access count. The preset condition can also be the top L user data sets with the largest access counts. The preset condition may also be a user data whose access count is within a preset number of access counts. Embodiments of the present application are not limited in this aspect.

Generally, user data with a high access count is hotspot data, and data with a low access count is non-hotspot data. As non-hotspot data is accessed by fewer users, in the embodiments of the present application, in order to save the storage space of the nodes in the storage server, the security of the non-hotspot data may not be improved. That is, embodiments of the present application may only improve the security of hotspot data.

In an embodiment of the present application, the preset condition matches a condition of being hotspot data. In other words, user data whose access count meets the preset condition is taken as hotspot data. The management server determines a first user data set whose access count in the cloud storage resource pool meets a preset condition, i.e., the management server determines hotspot data in the cloud storage resource pool. There may be a plurality of first user data sets. That is, the management server may determine one or more user data sets from user data sets in the cloud storage resource pool, and use the one or more user data sets as the first user data.

S103, obtaining a second security level according to attribute information of the cloud storage resource pool. The attribute information includes a first security level and an increment for security step.

The security step of the second security level is greater than the security step of the first security level. That is, the data security of the second security level is greater than the data security of the first security level.

In the embodiment of the present application, when the management server configures the cloud storage resource pool, a user can set the attribute information of the cloud storage resource pool according to amount of data to be stored. The attribute information may include a storage space of the cloud storage resource pool, a first security level, and an increment for security step.

The unit of the storage space of the cloud storage resource pool may be GB.

The first security level represents a maximum number of damaged nodes that would not cause loss of stored data in the cloud storage resource pool included in the storage server, and is typically represented by N+M. For example, if the user sets N=4 and M=1, i.e., the user sets the first security level to 4+1, the user data can still be read if one of data storing nodes is corrupted, but the user data cannot be read when more than one data storing nodes are damaged. If the user sets N=8 and M=3, that is, the user sets the first security level to 8+3, the user data can still be read damaged data storing nodes are not more than 3, and cannot be read if more than three nodes storing the user data is located is corrupted.

The increment for security step represents increment in value of M in N+M. M in N+M represents the security step of the first security level. The security step of the second security level obtained by the management server according to the attribute information is greater than the security step of the first security level. The security of user data of the second security level is higher than that of user data of the first security level. In other words, in case of fixed number of normal nodes, the storage server has an increased tolerance of abnormal nodes while allowing the user data to be read. In the embodiment of the present application, if the second security level is N+X, X is less than or equal to N.

S104, re-encoding the first user data set with an erasure coding algorithm of the second security level to obtain re-encoded first user data.

In S104, a re-encoding instruction including the second security level is sent to the storage server. The re-encoding instruction is used to instruct the storage server to decode the first user data set according to the first security level, and re-encode the decoded first user data with an erasure coding algorithm of the second security level, so as to obtain re-encoded first user data. The re-encoded first user data is stored in the cloud storage resource pool.

Specifically, the management server sends a re-encoding instruction to the storage server. The storage server re-encodes the user data according to the second security level included in the re-encoding instruction, through an erasure coding algorithm of the second security level, to obtain re-encoded user data and redundant data thereof. The re-encoded user data and the redundant data thereof are stored in a cloud storage resource pool.

After obtaining a second security level higher than the first security level through S103, the storage server re-encodes the first user data with the erasure coding algorithm of the second security level, thereby improving the security of the first user data. The security of hotspot data is thus improved. As such, security of user data stored in the storage server is improved, and thus security of user data in the cloud storage resource pool is improved.

In calculation of access counts in the embodiment of the present application, an access is taken into account only after an access request is received from a user, therefore, the step of calculating access counts may be implemented before or after any step of S101, S102, S103, and S104. Embodiments of the present application are not limited in this aspect.

It can be seen that in the method for improving data storage security in the embodiment of the present application, the management server in the cloud storage system determines first user data whose access account in the cloud storage resource pool meets a preset condition by detecting access accounts of user data in the cloud storage resource pool. A second security level is obtained according to attribute information of the cloud storage resource pool, and has a greater security step than that of the first security level. The management server sends a re-encoding instruction including the second security level to the storage server. The storage server in the cloud storage system re-encodes the first user data with an erasure coding algorithm of the second security level to obtain re-encoded first user data. In this way, hot data, i.e., the first user data is re-encoded with the second security level having an increased security step. As such, the security of the first user data is improved. Therefore, the security of user data in the cloud storage resource pool can also be improved.

In addition, in the embodiment of the present application, security level of the first user data that meets the preset condition is improved, and the security level of other user data that does not meet the preset condition is not improved. This improves the security of user data in the cloud storage resource pool while reducing the waste of storage space.

Figure 2:
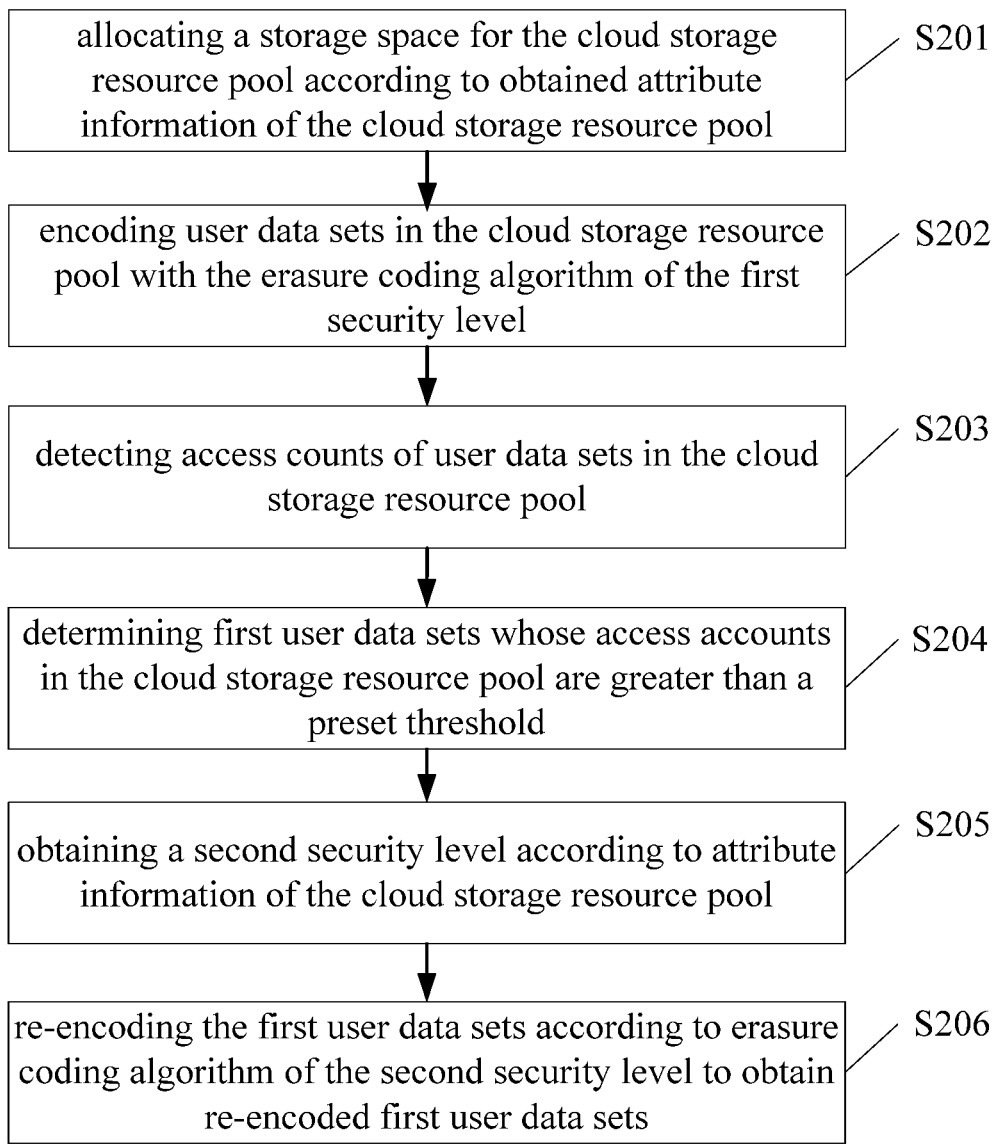
FIG. 2 is a flowchart of another method for improving data storage security according to an embodiment of the present application.

In the embodiment of FIG. 1, as user data in the cloud storage resource pool is user data encoded with erasure coding algorithm of a first security level, therefore, before S101, it is necessary to allocate storage space for the cloud storage resource pool, and encode the user data in the cloud storage resource pool. Referring to FIG. 2, FIG. 2 is a flowchart of another method for improving data storage security according to an embodiment of the present application. The method includes the following steps:

S201, allocating a storage space for the cloud storage resource pool according to obtained attribute information of the cloud storage resource pool.

In the embodiment of the present application, before the user stores data in cloud storage resource pool, the management server allocates a storage space for the cloud storage resource pool according to attribute information of the cloud storage resource pool set by the user. After allocating a storage space, the user can store user data in the cloud storage resource pool. The size of user data is less than or equal to the size of the allocated storage space.

For example, if attribute information of the cloud storage resource pool indicates that amount of data to be stored is 2 Gb, the management server allocates a storage space not less than 2 Gb for the cloud storage resource pool. Here, the data to be stored includes user data and redundant data.

The management server configures the cloud storage resource pool with the first security level while allocating storage space to the cloud storage resource pool.

S202, encoding user data sets in the cloud storage resource pool with the erasure coding algorithm of the first security level.

In S202, the management server sends an encoding instruction to the storage server. The encoding instruction includes a first security level. The encoding instruction is used to instruct the storage server to encode user data according to the erasure coding algorithm of the first security level, and store the encoded user data in the cloud storage resource pool.

Specifically, the management server sends an encoding instruction to the storage server. The storage server encodes the user data according to the first security level included in the encoding instruction with erasure coding algorithm of the first security level, to obtain encoded user data and redundant data thereof. The encoded user data and redundant data thereof are stored in a cloud storage resource pool.

When the user stores the user data in the cloud storage resource pool, the storage server encodes the user data with the erasure coding algorithm of the first security level, and stores the encoded user data in nodes included in the cloud storage resource pool. When the user reads user data from or writes user data into the cloud storage resource pool, the storage server can conveniently manage the user data in the cloud storage resource pool, and encode and decode the user data in the cloud storage resource pool with the erasure coding algorithm of the first security level of the cloud storage resource pool.

S203, detecting access counts of user data sets in the cloud storage resource pool, where the user data sets in the cloud storage resource pool are obtained by data encoding with an erasure coding algorithm of the first security level.

S204, determining first user data sets whose access accounts in the cloud storage resource pool are greater than a preset threshold.

S205, obtaining a second security level according to attribute information of the cloud storage resource pool, wherein the attribute information includes the first security level and an increment for security step.

S206, re-encoding the first user data sets according to erasure coding algorithm of the second security level to obtain re-encoded first user data sets.

Since S203, S204, S205, and S206 are the same as S101, S102, S103, and S104 in the embodiment of FIG. 1, all the implementations in the embodiment of FIG. 1 are applicable to FIG. 2 with the same or similar benefits, description thereof is thus omitted here.

It can be seen that, in the method for improving data storage security provided by the embodiment of the present application, after management server allocates storage space for the cloud storage resource pool, the user can store user data in the cloud storage resource pool. The storage server can encode the user data with an erasure coding algorithm of the first security level. The encoded user data is stored in the cloud storage resource pool, so that the user data in the cloud storage resource pool is user data with certain security. Then, the management server detects access counts of user data sets in the cloud storage resource pool to determine first user data sets whose access counts in the cloud storage resource pool meet a preset condition. The management server instructs the storage server to re-encode the first user data with the erasure coding algorithm of the second security level to obtain user data with higher security level, thereby improving the security of the user data in the cloud storage resource pool.

Figure 3:
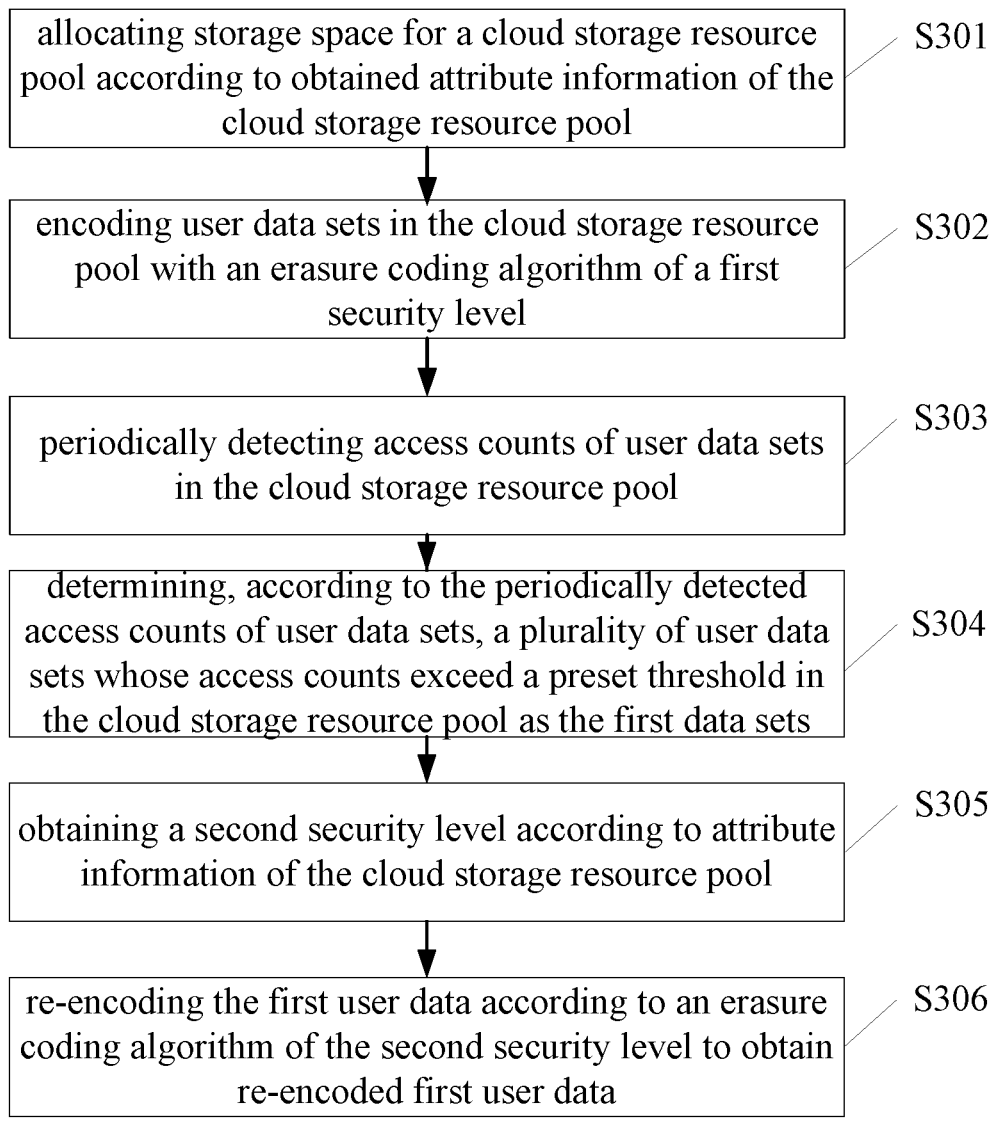
FIG. 3 is a flowchart of another method for improving data storage security according to an embodiment of the present application.

Based on the same inventive concept, referring to FIG. 3, FIG. 3 is another flowchart of a method for improving data storage security according to an embodiment of the present application, including the following steps:

S301, allocating storage space for a cloud storage resource pool according to obtained attribute information of the cloud storage resource pool.

S302, encoding user data sets in the cloud storage resource pool with an erasure coding algorithm of a first security level.

S303, periodically detecting access counts of user data sets in the cloud storage resource pool.

In the embodiment of the present application, the management server may periodically detect access counts of user data sets in the cloud storage resource pool. The detection period may be 6 hours, 12 hours, or one day, or otherwise set according to performance of the management server and frequency of user's data access. Embodiments are not limited in this aspect.

S304, determining, according to the periodically detected access counts of user data sets, a plurality of user data sets whose access counts exceed a preset threshold in the cloud storage resource pool as the first data sets.

S304 means that determining, according to periodically detected access counts of user data sets, a plurality of user data sets whose access counts meet a preset condition in the cloud storage resource pool as the first user data sets.

In the embodiment of the present application, the management server determines, in each detection period, a first user data set whose access count in the cloud storage resource pool meets a preset condition. For different detection period, the obtained first user data set may be the same or different. There may be a plurality of first user data. That is, a plurality of user data sets whose access counts in the cloud storage resource pool meet the preset condition are taken as the first user data.

In this way, by periodically detecting access counts of user data, real-time hotspot data can be obtained, and the security of the hotspot data can be improved. In addition, during one detection period, the management server instructs the storage server to process the first user data in a centralized manner. Re-encoding the first user data with the erasure coding algorithm of the second security level can reduce the processing frequency with which the storage server processes the user data. Thus, life of the storage server is prolonged.

In an implementation of the embodiment of the present application, determining a first user data set whose access count in the cloud storage resource pool meets a preset condition includes:

sorting user data sets in the cloud storage resource pool in a descending order of access counts to obtain top L user data sets, and determining the top L user data sets as first user data sets, wherein L is an integer greater than 0.

In another implementation manner of the embodiment of the present application, determining a first user data set whose access count in the cloud storage resource pool meets a preset condition includes:

extracting, from the cloud storage resource pool, user data sets whose access counts are greater than or equal to a preset access number threshold as first user data sets.

In the embodiment of the present application, first user data sets, i.e., hotspot data sets may be determined according to the access counts thereof. For example, in a detection period, user data sets in the cloud storage resource pool may be sorted in a descending order of access counts, and the top L user data sets can be determined as the first user data sets. The L can be set according to amount of user data and storage server's ability in data processing. Embodiments are not limited in this aspect.

For another example, in one detection period, user data sets whose access counts are greater than or equal to a preset access count threshold are extracted from the cloud storage resource pool as first user data sets. The preset threshold can be set according to actual conditions. For example, in case where user data having access counts above 1000 in one detection period is regarded as hotspot data, the preset access count threshold may be set to 1000. Here, the preset access count threshold may also be other values set according to actual conditions.

The method for determining first user data sets whose access counts in the cloud storage resource pool meet a preset condition is also applicable to S102 in the embodiment of FIG. 1 and S204 in the embodiment of FIG. 2.

S305, obtaining a second security level according to attribute information of the cloud storage resource pool.

When the management server creates a cloud storage resource pool, the user can set the attribute information of the cloud storage resource pool according to the size of data to be stored. The attribute information may include: a storage space of the cloud storage resource pool, a first security level, and an increment for security step. The second security level can be obtained according to the first security level and the increment for security step, and the data security of the second security level is higher than the data security of the first security level.

In an implementation of the application, obtaining the second security level according to the attribute information of the cloud storage resource pool may include:

for a first security level of N+M and an increment for security step of i, determining the second security level as N+(M+i), wherein, N is the number of nodes for a user data set in the cloud storage resource pool, and M and M+i are maximum numbers of abnormal nodes in the nodes for the user data set in the cloud storage resource pool when user data set can be read, wherein M, N, and i are integers greater than 0, and M+i is less than or equal to N.

Here, N is the number of nodes for a user data set in the cloud storage resource pool, that is, N is the number of nodes storing a user data set. The first security level is N+M, where M is the maximum number of abnormal nodes in the nodes for the user data set in the cloud storage resource pool when user data set can be read. The second security level is N+(M+i), where M+i is the maximum number of abnormal nodes in the nodes for the user data set in the cloud storage resource pool when user data set can be read.

In an implementation of the application, obtaining the second security level according to the attribute information of the cloud storage resource pool may include:

for a first security level of N+M and an increment for security step of i, determining the second security level as N+(M+2*i), wherein, N is the number of nodes for a user data set in the cloud storage resource pool, and M and M+2*i are maximum numbers of abnormal nodes in the nodes for the user data set in the cloud storage resource pool when user data set can be read, wherein M, N, and i are integers greater than 0, and M+i is less than or equal to N.

The first security level is N+M, where M is the maximum number of abnormal nodes in the nodes for the user data set in the cloud storage resource pool when user data set can be read. The second security level is N+(M+2*i), where M+2*i is the maximum number of abnormal nodes in the nodes for the user data set in the cloud storage resource pool when user data set can be read.

In the embodiment of the present application, the second security level can be obtained according to the attribute information of the cloud storage resource pool in other manners. Embodiments are not limited in this aspect.

In the embodiment of the present application, in the storage server, user data is data stored in nodes of the storage server after being encoded with an erasure coding algorithm of the first security level. The first security level N+M indicates that the user data is stored in N nodes, that is, N is the number of nodes of the storage server. Redundant data is stored in the M nodes, that is, M is the maximum number of abnormal nodes in the node of the storage server. That is, when the number of damaged nodes is less than or equal to M, the user data can still be read, and when the number of damaged nodes is greater than M, the user data cannot be readable. The increment for security step is an increasable number of nodes storing redundant data in case of a fixed number of nodes storing the user data. In this way, after the node storing the user data is fixed, when the node storing the redundant data is increased, it indicates that the maximum number of nodes that can be damaged when the user data is readable is increased, and accordingly, the security of the user data is improved.

For example, if the first security level set by the user is 4+1 and the increment for security step is 1, the first security level of 4+1 is, after improved, to be a second security level of 4+2. If the first security level set by the user is 4+1 and the increment for security step is 2, the first security level of 4+1 is, after improved, to be the second security level of 4+3.

The above method of determining the second security level is equally applicable to S103 in the embodiment of FIG. 1 and S205 in the embodiment of FIG. 2.

S306, re-encoding the first user data according to an erasure coding algorithm of the second security level to obtain re-encoded first user data.

Since S301, S302, S305, and S306 are the same as S201, S202, S205, and S206 in the embodiment of FIG. 2. All the implementations in FIG. 2 are applicable to FIG. 3, and all the same or similar benefits can be achieved, and are not described herein again.

In the method for improving data storage security provided by the embodiment of the present application, after the management server allocates storage space for the cloud storage resource pool, the user can store user data in the cloud storage resource pool, that is, the storage server can encode the user data according to the erasure coding algorithm of the first security level. The encoded user data is stored in the cloud storage resource pool, so that the user data in the cloud storage resource pool is user data with certain security. The management server obtains a first user data for which the number of accesses in the cloud storage resource pool meets a preset condition and exceeds a preset threshold by periodically detecting the number of accesses for the user data in the cloud storage resource pool. The management server instructs the storage server to re-encode the first user data by using the erasure coding algorithm of the second security level to obtain user data with higher security level, thereby improving the security of the user data in the cloud storage resource pool.

Figure 4:
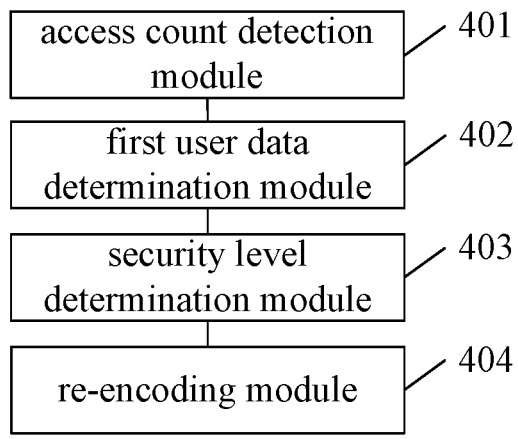
FIG. 4 is a structural diagram of a device for improving data storage security according to an embodiment of the present application.

Corresponding to the foregoing method embodiments, the embodiment of the present application further discloses a device for improving data storage security. Referring to FIG. 4, FIG. 4 is a structural diagram of a device for improving data storage security according to an embodiment of the present disclosure, including:

an access count detection module 401, configured for detecting access counts of user data sets in a cloud storage resource pool, where the user data sets in the cloud storage resource pool are data obtained by encoding with an erasure coding algorithm of a first security level;

a first user data determination module 402, configured for determining a first user data set whose access count in the cloud storage resource pool meets a preset condition;

a security level determination module 403, configured for obtaining a second security level according to attribute information of the cloud storage resource pool, wherein the attribute information includes the first security level and an increment for security step, and the second security level has a security step greater than that of the first security level; and a re-encoding module 404, configured for re-encoding the first user data set with an erasure coding algorithm of the second security level to obtain re-encoded first user data sets.

It can be seen that, the device for improving data storage security in the embodiment of the present application detects access counts of user data sets in a cloud storage resource pool, and thus determines a first user data set whose access count in the cloud storage resource pool meets a preset condition. A second security level is obtained according to attribute information of the cloud storage resource pool. The security step of the second security level is greater than the security step of the first security level. The first user data set is re-encoded with an erasure coding algorithm of the second security level to obtain re-encoded first user data sets. In this way, the first user data is re-encoded in the second security level having an increased security step. As such, the security of the first user data set is improved and thus the security of user data in the cloud storage resource pool is improved.

The device of the embodiment of the present application is the device for applying the foregoing method for improving data storage security, and all the embodiments of the foregoing method for improving data storage security are applicable to the device, and all of the same or similar beneficial effects can be achieved.

Figure 5:
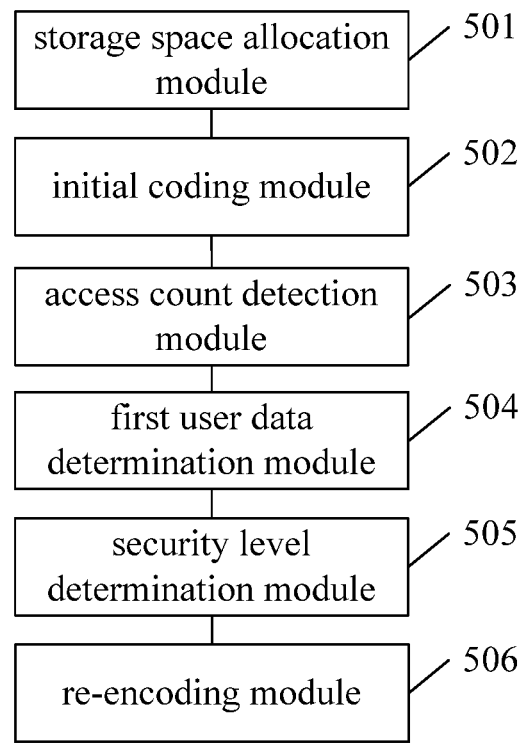
FIG. 5 is a structural diagram of another device for improving data storage security according to an embodiment of the present application.

Referring to FIG. 5, FIG. 5 is another structural diagram of a device for improving data storage security according to an embodiment of the present application, including:

a storage space allocation module 501, configured for allocating a storage space for the cloud storage resource pool according to obtained attribute information of the cloud storage resource pool;

an initial coding module 502, configured for encoding user data sets in the cloud storage resource pool with an erasure coding algorithm of a first security level;

an access count detection module 503, configured for detecting access counts of user data sets in a cloud storage resource pool, where the user data sets in the cloud storage resource pool are data obtained by encoding with an erasure coding algorithm of a first security level;

a first user data determination module 504, configured for determining a first user data set whose access count in the cloud storage resource pool meets a preset condition;

a security level determination module 505, configured for obtaining a second security level according to attribute information of the cloud storage resource pool, wherein the attribute information includes the first security level and an increment for security step, and the second security level has a security step greater than that of the first security level; and a re-encoding module 506, configured for re-encoding the first user data set with an erasure coding algorithm of the second security level to obtain re-encoded first user data sets.

It can be seen that, according to the device for improving data storage security provided by the embodiment of the present application, after management server allocates storage space for the cloud storage resource pool, the user can store user data in the cloud storage resource pool. The storage server can encode the user data with an erasure coding algorithm of the first security level. The encoded user data is stored in nodes included by the cloud storage resource pool, so that the user data in the cloud storage resource pool is user data with certain security. Then, the management server detects access counts of user data sets in the cloud storage resource pool to determine first user data sets whose access counts in the cloud storage resource pool meet a preset condition. The management server instructs the storage server to re-encode the hot data with the erasure coding algorithm of the second security level to obtain user data with higher security level, thereby improving the security of the user data in the cloud storage resource pool.

Optionally, in the device for improving data storage security provided by the embodiment of the present application, an access count detection module includes:

a periodic detection submodule, configured for periodically detecting access counts of user data sets in the cloud storage resource pool.

The first user data determination module includes:

a multiple user data determination submodule, configured for determining, according to the periodically detected access counts of user data sets, a plurality of user data sets whose access counts meet a preset condition in the cloud storage resource pool as first user data sets.

Optionally, in the device for improving data storage security provided by the embodiment of the present application, the first user data determination module includes:

a first determination submodule, configured for sorting user data sets in the cloud storage resource pool in a descending order of access counts to obtain top L user data sets, and determining the top L user data sets as first user data sets, wherein L is an integer greater than 0; or a second determination submodule, configured for extracting, from the cloud storage resource pool, user data sets whose access counts are greater than or equal to a preset access count threshold as first user data sets.

Optionally, in the device for improving data storage security provided by the embodiment of the present application, the security level determination module is specifically configured for: for a first security level of N+M and an increment for security step of i, determining the second security level as N+(M+i), wherein, N is the number of nodes for a user data set in the cloud storage resource pool, and M and M+i are maximum numbers of abnormal nodes in the nodes for the user data set in the cloud storage resource pool when user data set can be read, wherein M, N, and i are integers greater than 0, and M+i is less than or equal to N.

In the embodiments of the present application, after management server allocates storage space for the cloud storage resource pool, the user can store user data in the cloud storage resource pool. The storage server in the cloud storage system can encode the user data with an erasure coding algorithm of the first security level. The encoded user data is stored in nodes included in the cloud storage resource pool, so that the user data in the cloud storage resource pool is user data with certain security. Then, the management server detects access counts of user data sets in the cloud storage resource pool to determine first user data sets whose access counts in the cloud storage resource pool meet a preset condition. The management server instructs the storage server to re-encode hot user data with the erasure coding algorithm of the second security level to obtain user data with higher security level, thereby improving the security of the user data in the cloud storage resource pool.

Figure 6:
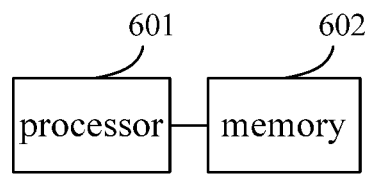
FIG. 6 is a structural diagram of an electronic device according to an embodiment of the present application.

Based on the same inventive concept, an embodiment of the present application further provides an electronic device, as shown in FIG. 6, including a processor 601 and a memory 602, where the memory 602 is used to store a computer program; the processor 601 is configured to execute the program stored on the memory 602 to perform the method steps of improving data storage security as described above. The method for improving data storage security includes:

detecting access counts of user data sets in a cloud storage resource pool, where the user data sets in the cloud storage resource pool are data obtained by encoding with an erasure coding algorithm of a first security level;

determining a first user data set whose access count in the cloud storage resource pool meets a preset condition;

obtaining a second security level according to attribute information of the cloud storage resource pool, wherein the attribute information includes the first security level and an increment for security step, and the second security level has a security step greater than that of the first security level; and re-encoding the first user data set with an erasure coding algorithm of the second security level to obtain re-encoded first user data sets.

In the embodiments of the present application, access counts of user data sets in a cloud storage resource pool are detected, and thus a first user data set whose access count in the cloud storage resource pool meets a preset condition is determined; a second security level is obtained according to attribute information of the cloud storage resource pool, wherein, the security step of the second security level is greater than the security step of the first security level; and the first user data set is re-encoded with an erasure coding algorithm of the second security level to obtain re-encoded first user data sets. In this way, the first user data is re-encoded in the second security level having an increased security step. As such, the security of the first user data set is improved and thus the security of user data in the cloud storage resource pool is improved.

The memory may include a RAM (Random Access Memory), and may also include NVM (Non-Volatile Memory), such as at least one disk storage. Optionally, the memory may also be at least one storage device remote from the aforementioned processor.

The processor may be a general-purpose processor, including a CPU (Central Processing Unit), an NP (Network Processor), or the like, or a DSP (Digital Signal Processing), ASIC (Application Specific Integrated Circuit), FPGA (Field-Programmable Gate Array) or other programmable logic device, discrete gate or transistor logic device, discrete hardware component.

Based on the same inventive concept, an embodiment of the present application further discloses a machine readable storage medium having a computer program stored thereon which when executed by a processor, causes the processor to perform a of improving data storage security. The method for improving data storage security includes:

detecting access counts of user data sets in a cloud storage resource pool, where the user data sets in the cloud storage resource pool are data obtained by encoding with an erasure coding algorithm of a first security level;

determining a first user data set whose access count in the cloud storage resource pool meets a preset condition;

obtaining a second security level according to attribute information of the cloud storage resource pool, wherein the attribute information includes the first security level and an increment for security step, and the second security level has a security step greater than that of the first security level; and re-encoding the first user data set with an erasure coding algorithm of the second security level to obtain re-encoded first user data sets.

In the embodiments of the present application, access counts of user data sets in a cloud storage resource pool are detected, and thus a first user data set whose access count in the cloud storage resource pool meets a preset condition is determined; a second security level is obtained according to attribute information of the cloud storage resource pool, wherein, the security step of the second security level is greater than the security step of the first security level; and the first user data set is re-encoded with an erasure coding algorithm of the second security level to obtain re-encoded first user data sets. In this way, the first user data is re-encoded in the second security level having an increased security step. As such, the security of the first user data set is improved and thus the security of user data in the cloud storage resource pool is improved.

Based on the same inventive concept, an embodiment of the present application further discloses a computer program which, when executed by a processor, causes the processor to perform a method for improving data storage security. The method for improving data storage security includes:

detecting access counts of user data sets in a cloud storage resource pool, where the user data sets in the cloud storage resource pool are data obtained by encoding with an erasure coding algorithm of a first security level;

determining a first user data set whose access count in the cloud storage resource pool meets a preset condition;

obtaining a second security level according to attribute information of the cloud storage resource pool, wherein the attribute information includes the first security level and an increment for security step, and the second security level has a security step greater than that of the first security level; and re-encoding the first user data set with an erasure coding algorithm of the second security level to obtain re-encoded first user data sets.

In the embodiments of the present application, access counts of user data sets in a cloud storage resource pool are detected, and thus a first user data set whose access count in the cloud storage resource pool meets a preset condition is determined; a second security level is obtained according to attribute information of the cloud storage resource pool, wherein, the security step of the second security level is greater than the security step of the first security level; and the first user data set is re-encoded with an erasure coding algorithm of the second security level to obtain re-encoded first user data sets. In this way, the first user data is re-encoded in the second security level having an increased security step. As such, the security of the first user data set is improved and thus the security of user data in the cloud storage resource pool is improved.

It should be noted that, in this context, relational terms such as first and second are used merely to distinguish one entity or operation from another entity or operation, and it does not necessarily require or imply any such actual relationship or order between these entities or operations. Furthermore, the term "includes" or "comprises" or any other variations thereof is intended to encompass a non-exclusive inclusion, thus, a process, method, article, or device that comprises a plurality of elements includes not only those elements but also other elements that are not explicitly listed, or elements that are inherent to such a process, method, article, or device. Without more restrictions, an element defined by the phrase "comprising a" does not exclude that there are additional identical elements in the process, method, article or device that includes the elements.

The various embodiments in the present specification are described in a related manner, and the same or similar parts between the various embodiments may be referred to each other, and each embodiment focuses on the differences from the other embodiments. In particular, for embodiments of device for improving data storage security, electronic device, machine readable storage medium, a computer program, since it is basically similar to the embodiment of method for improving the data storage security, the description is relatively simple, and the relevant parts can be referred to the description of the embodiment of method for improving the data storage security.

The above description is only the preferred embodiment of the present application, and is not intended to limit the scope of the present application. Any modifications, equivalent substitutions, improvements, etc. made within the spirit and principles of the present application are included in the scope of the present application.

What is claimed is:

1. A method for improving data storage security, comprising:
   detecting access counts of user data sets in a cloud storage resource pool, where the user data sets in the cloud storage resource pool are data obtained by encoding with an erasure coding algorithm of a first security level;
   determining a first user data set whose access count in the cloud storage resource pool meets a preset condition;
   obtaining a second security level according to attribute information of the cloud storage resource pool, wherein the attribute information includes the first security level and an increment for security step, and the second security level has a security step greater than that of the first security level; and
   re-encoding the first user data set with an erasure coding algorithm of the second security level to obtain re-encoded first user data sets;
   wherein for a first security level of N+M and an increment for security step of i, determining the second security level as N+(M+i), wherein, N is the number of nodes for a user data set in the cloud storage resource pool, and M and M+i are maximum numbers of abnormal nodes in the nodes for the user data set in the cloud storage resource pool when the user data set can be read, wherein M, N, and i are integers greater than 0, and M+i is less than or equal to N.

2. The method for improving data storage security according to claim 1, wherein detecting access counts of user data sets in a cloud storage resource pool comprises:
   periodically detecting access counts of user data sets in the cloud storage resource pool;
   determining a first user data set whose access count in the cloud storage resource pool meets a preset condition comprises:
      determining, according to the periodically detected access counts of user data sets, a plurality of user data sets whose access counts meet a preset condition in the cloud storage resource pool as first user data sets.

3. The method for improving data storage security according to claim 1, wherein determining a first user data set whose access count in the cloud storage resource pool meets a preset condition comprises:
   sorting user data sets in the cloud storage resource pool in a descending order of access counts to obtain top L user data sets, and determining the top L user data sets as first user data sets, wherein L is an integer greater than 0; or
   extracting, from the cloud storage resource pool, user data sets whose access counts are greater than or equal to a preset access count threshold as first user data sets.

4. The method for improving data storage security according to claim 1, wherein, before detecting access counts of user data sets in a cloud storage resource pool, the method further comprises:
   allocating a storage space for the cloud storage resource pool according to the attribute information of the cloud storage resource pool; and
   encoding user data sets in the cloud storage resource pool with the erasure coding algorithm of the first security level.

5. An electronic device, comprising: a processor and a memory;
   the memory is configured for storing a computer program;
   the processor is configured for executing the program stored on the memory to perform operations of:
      detecting access counts of user data sets in a cloud storage resource pool, where the user data sets in the cloud storage resource pool are obtained by data encoding with an erasure coding algorithm of a first security level;
      determining a first user data set whose access count in the cloud storage resource pool meets a preset condition;
      obtaining a second security level according to attribute information of the cloud storage resource pool, wherein the attribute information includes the first security level and an increment for security step, and the second security level has a security step greater than that of the first security level; and
      re-encoding the first user data set with an erasure coding algorithm of the second security level to obtain re-encoded first user data sets;
   wherein for a first security level of N+M and an increment for security step of i, determining the second security level as N+(M+i), wherein, N is the number of nodes for a user data set in the cloud storage resource pool, and M and M+i are maximum numbers of abnormal nodes in the nodes for the user data set in the cloud storage resource pool when the user data set can be read, wherein M, N, and i are integers greater than 0, and M+i is less than or equal to N.

6. The electronic device according to claim 5, wherein, the processor is further configured for executing a program stored on the memory to perform operations of:
   sorting user data sets in the cloud storage resource pool in a descending order of access counts to obtain top L user data sets, and determining the top L user data sets as first user data sets, wherein L is an integer greater than 0; or
   extracting, from the cloud storage resource pool, user data sets whose access counts are greater than or equal to a preset access count threshold as first user data sets.

7. A non-transitory machine readable storage medium having a computer program stored thereon which, when executed by a processor, causes the processor to perform the method steps of claim 1.

8. The electronic device according to claim 5, wherein, detecting access counts of user data sets in a cloud storage resource pool comprises:
 periodically detecting access counts of user data sets in the cloud storage resource pool; and
 wherein determining a first user data set whose access count in the cloud storage resource pool meets a preset condition comprises:
  determining, according to the periodically detected access counts of user data sets, a plurality of user data sets whose access counts meet a preset condition in the cloud storage resource pool as first user data sets.

9. The electronic device according to claim 5, wherein,
 the processor is further configured for executing a program stored on the memory to perform operations of, before detecting access counts of user data sets in a cloud storage resource pool,
 allocating a storage space for the cloud storage resource pool according to the attribute information of the cloud storage resource pool; and
 encoding user data sets in the cloud storage resource pool with the erasure coding algorithm of the first security level.

* * * * *